United States Patent
Izuhara

(10) Patent No.: US 10,639,938 B2
(45) Date of Patent: May 5, 2020

(54) PNEUMATIC TIRE

(71) Applicant: TOYO TIRE & RUBBER CO., LTD., Itami-shi, Hyogo (JP)

(72) Inventor: Yuji Izuhara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 260 days.

(21) Appl. No.: 15/683,012

(22) Filed: Aug. 22, 2017

(65) Prior Publication Data

US 2018/0134095 A1    May 17, 2018

(30) Foreign Application Priority Data

Nov. 11, 2016 (JP) .................. 2016-220637

(51) Int. Cl.
*B60C 11/01* (2006.01)
*B60C 11/13* (2006.01)

(52) U.S. Cl.
CPC .......... *B60C 11/1315* (2013.01); *B60C 11/01* (2013.01); *B60C 11/1323* (2013.01); *B60C 2011/013* (2013.01)

(58) Field of Classification Search
CPC ............... B60C 13/02; B60C 2011/013; B60C 2011/0348; B60C 11/1281
USPC .................................................. 152/209.27
See application file for complete search history.

(56) References Cited

U.S. PATENT DOCUMENTS

2008/0257469 A1  10/2008  Ohara

FOREIGN PATENT DOCUMENTS

| JP | 3-7604 A | 1/1991 |
|---|---|---|
| JP | 11-48716 A | 2/1999 |
| JP | 11048716 A * | 2/1999 |
| JP | 2001-260612 A | 9/2001 |
| WO | 2015/136996 A1 | 9/2015 |
| WO | WO-2015136996 A1 * | 9/2015 ............. B60C 11/01 |

OTHER PUBLICATIONS

Office Action dated Jun. 27, 2019, issued in Chinese Patent Application No. 201710753342.4 with English translation.

* cited by examiner

*Primary Examiner* — Robert C Dye
*Assistant Examiner* — Farah Taufiq
(74) *Attorney, Agent, or Firm* — Westerman, Hattori, Daniels & Adrian, LLP

(57) ABSTRACT

A pneumatic tire includes a shoulder land portion and a narrow groove in a tread surface. The narrow groove extends in the tire circumferential direction and sections the shoulder land portion into a main land portion and a sub land portion. A first groove portion extends in parallel to the tire equator surface from the tread surface toward an inner side in a tire radial direction. A second groove portion is provided closer to the inner side in the tire radial direction and the tire equator surface side than the first groove portion, and extends in parallel to the tire equator surface. A connection portion is connected to the first groove portion and the second groove portion. A groove bottom portion is provided in an end portion of the second groove portion and has a widened groove width by depressing a groove wall of the second groove portion.

10 Claims, 2 Drawing Sheets

PNEUMATIC TIRE

BACKGROUND OF THE INVENTION

Field of the Invention

The present invention relates to a pneumatic tire having a shoulder land portion, and a narrow groove sectioning the shoulder land portion into a main land portion in tire equator surface side and a sub land portion in a ground contact end side.

Description of the Related Art

In a pneumatic tire under traveling, a ground contact pressure generally tends to become higher in the vicinity of a ground contact end in a shoulder land portion of a tread surface. As a result, there may be generated a problem that an amount of wear becomes great in the vicinity of the ground contact end of the shoulder land portion in comparison with the other land portions of the tread surface. As a method of preventing the irregular wear as mentioned above, it has been carried out to provide a narrow groove extending in a tire circumferential direction closer to an inner side in a tire width direction than the ground contact end, in the vicinity of the ground contact end of the shoulder land portion in the tread surface. The narrow groove sections the shoulder land portion into a main land portion in a tire equator surface side and a sub land portion in a ground contact end side, and suppresses the wear of the main land portion.

However, even if the narrow groove is provided, the ground contact pressure becomes higher in the portion near the narrow groove in the main land portion in the tire equator surface side, thereby newly causing the irregular wear within the main land portion. Further, in the sub land portion in the ground contact end side, the higher rigidity thereof is more effective for reducing the irregular wear; however, in the case that the rigidity of the sub land portion is made too high, any crack may be generated in the sub land portion itself due to the deformation applied to the sub land portion during the traveling, and any crack may be generated in the groove bottom of the narrow groove by the concentration of the strain in the groove bottom of the narrow groove. As a result, the sub land portion may be broken and the effect of suppressing the irregular wear on the basis of the narrow groove may be lost.

PRIOR ART DOCUMENT

Patent Document

Patent Document 1: JP-A-2001-260612
Patent Document 2: JP-A-11-48716
Patent Document 3: JP-A-3-7604

SUMMARY OF THE INVENTION

The present invention has been made in view of the actual condition mentioned above, and an object of the present invention is to provide a pneumatic tire which improves an irregular wear resistance.

The object can be achieved by the following present invention. That is, the present invention provides a pneumatic tire including a shoulder land portion which extends in a tire circumferential direction, and a narrow groove which extends in the tire circumferential direction closer to a tire equator surface side than a ground contact end of the shoulder land portion and sections the shoulder land portion into a main land portion in the tire equator surface side and a sub land portion in the ground contact end side, the shoulder land portion and the narrow groove being provided in a tread surface, wherein a cross sectional shape of the narrow groove in a tire width direction includes a first groove portion which extends in parallel to the tire equator surface from the tread surface toward an inner side in a tire radial direction, a second groove portion which is provided closer to the inner side in the tire radial direction and the tire equator surface side than the first groove portion, and extends in parallel to the tire equator surface, a connection portion which is connected to an end portion of the first groove portion in the inner side in the tire radial direction and an end portion of the second groove portion in the tread surface side, and a groove bottom portion which is provided in an end portion of the second groove portion in the inner side in the tire radial direction and has a widened groove width by depressing a groove wall of the second groove portion in the sub land portion side.

In the pneumatic tire according to the present invention, the ground contact pressure is reduced in the portion which is near the narrow groove of the main land portion and the ground contact pressure is uniformized within the main land portion by the provision of the second groove portion closer to the tire equator surface side than the first groove portion. As a result, the irregular wear resistance can be improved. In the same manner, the thickness in the tire width direction of the sub land portion is enlarged and the rigidity of the sub land portion can be enhanced by the provision of the second groove portion closer to the tire equator surface side than the first groove portion. As a result, the effect of suppressing the irregular wear can be enhanced. If the rigidity of the sub land portion is made too high, there is fear that a crack is generated in the groove bottom of the narrow groove as mentioned above. However, since the concentration of the strain in the groove bottom can be dispersed by the provision of the groove bottom portion which is depressed in the groove wall of the second groove portion in the sub land portion side, the crack can be suppressed in the groove bottom of the narrow groove. As a result according to the present invention, it is possible to provide the pneumatic tire which improves the irregular wear resistance.

In the pneumatic tire according to the present invention, a distance A in the tire width direction from a groove wall of the first groove portion in the sub land portion side to the groove wall of the second groove portion in the sub land portion side is preferably between 1.0 and 1.5 times of a distance B in the tire width direction from the groove wall of the second groove portion in the sub land portion side to an outermost end of the groove bottom portion in the tire width direction. According to the structure, it is possible to effectively reduce the ground contact pressure in the portion near the narrow groove of the main land portion.

Further, in the pneumatic tire according to the present invention, a distance C in the tire width direction from the outermost end of the groove bottom portion in the tire width direction to an outer wall of the sub land portion in the tire width direction is preferably equal to or more than 3.5 times of a distance B in the tire width direction from the groove wall of the second groove portion in the sub land portion side to the outermost end of the groove bottom portion in the tire width direction. According to the structure, it is possible to suppress generation of the crack in the sub land portion.

DETAILED DESCRIPTION OF THE PREFERRED EMBODIMENTS

Figure 1:
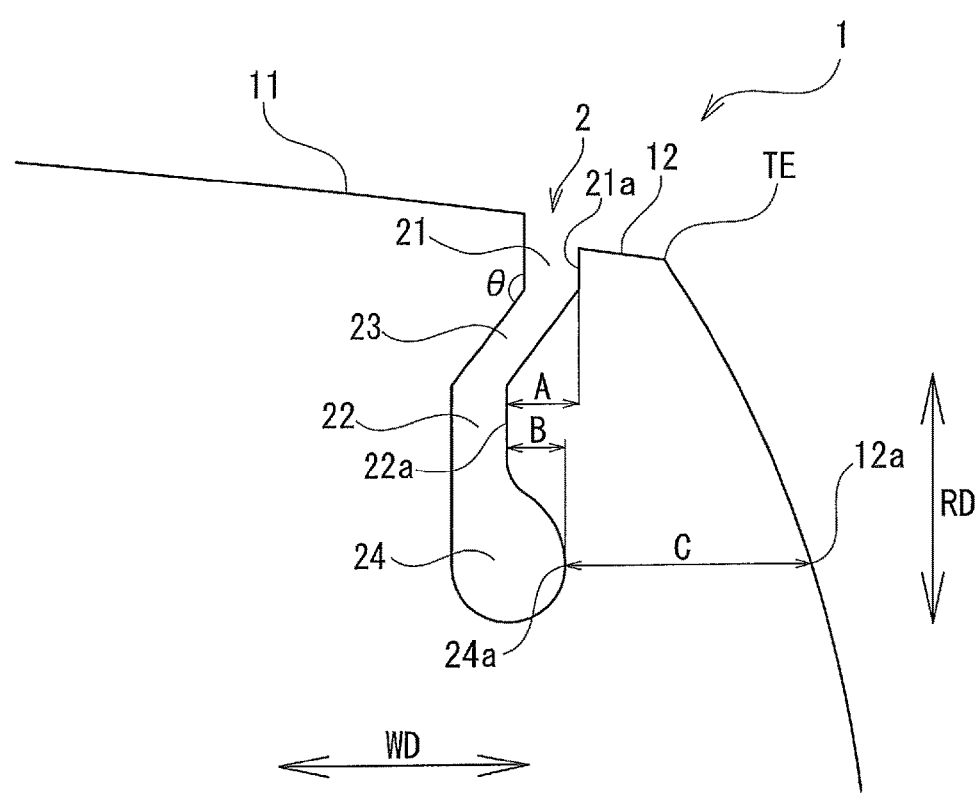
FIG. 1 is an example of a cross sectional view in a tire meridian direction in a shoulder land portion of a pneumatic tire according to the present invention.

A description will be given below of an embodiment according to the present invention. FIG. 1 is an example of a cross sectional view in a tire meridian direction in a shoulder land portion of a pneumatic tire according to the present invention. In FIG. 1, reference sign RD denotes a tire radial direction, and reference sign WD denotes a tire width direction.

As shown in FIG. 1, a pneumatic tire according to the present embodiment has a shoulder land portion 1 and a narrow groove 2 in a tread surface, the shoulder land portion 1 extending in a tire circumferential direction, and the narrow groove 2 extending in the tire circumferential direction in a side (a left side in FIG. 1) closer to a tire equator surface than a ground contact end TE of the shoulder land portion 1 and sectioning the shoulder land portion 1 into a main land portion 11 in the tire equator surface side and a sub land portion 12 in the ground contact end side.

The shoulder land portion 1 is positioned closer to an outer side in the tire width direction than a main groove (not shown in FIG. 1) extending in the tire circumferential direction in an outermost side of the tread surface in the tire width direction. A width of the main groove is greater than a width of the narrow groove 2, and the width of the main groove is, for example, between 8 and 16 mm. In the present embodiment, there is shown an example in which the shoulder land portion 1 including the main land portion 11 and the sub land portion 12 is constructed by a rib type. In the pneumatic tire in the present invention, the tread pattern can employ a rib type, a block type or a lug type without being limited.

The narrow groove 2 extends in the tire circumferential direction in a side (an inner side in the tire width direction) closer to the tire equator surface than the ground contact end TE of the shoulder land portion 1. In the present invention, in order to effectively reduce the irregular wear of the pneumatic tire, the narrow groove 2 is preferably provided in an area which is within 5% of the tread ground contact width on the basis of the ground contact end TE.

A cross sectional shape of the narrow groove 2 in the tire width direction WD is provided with a first groove portion 21, a second groove portion 22, a connection portion 23 which is connected to the first groove portion 21 and the second groove portion 22, and a groove bottom portion 24 which is arranged in an end portion in an inner side of the second groove portion 22 in the tire radial direction.

The first groove portion 21 is open to the tread surface, and extends from the tread surface toward the inner side in the tire radial direction. Further, the first groove portion 21 extends in parallel to the tire equator surface along the tire radial direction RD. A groove width of the first groove portion 21 is constant in an extending direction, and both groove walls of the first groove portion 21 are parallel to the tire equator surface. It is possible to make a releasing resistance of a rib part for forming the narrow groove 2 small when removing from the mold in a vulcanizing step by making the groove wall of the first groove portion 21 parallel to the tire equator surface. The groove width of the first groove width 21 is, for example, 2 to 4 mm.

The second groove portion 22 extends in parallel to the tire equator surface along the tire radial direction RD. Further, the groove width of the second groove portion 22 is fixed in the extending direction. The groove width of the second groove portion 22 may be the same as or different from the groove width of the first groove portion 21. The second groove portion 22 is provided closer to the inner side in the tire radial direction than the first groove portion 21, and the end portion of the second groove portion 22 in the tread surface side is positioned closer to the inner side in the tire radial direction than the end portion in the inner side of the first groove portion 21 in the tire radial direction.

Further, the second groove portion 22 is provided closer to the tire equator surface side than the first groove portion 21. More specifically, the second groove portion 22 is arranged by deviating the first groove portion 21 to the tire equator surface side. The ground contact pressure is reduced in the portion of the main land portion 11 near the narrow groove 2 and the ground contact pressure is uniformized within the main land portion 11 by the provision of the second groove portion 22 closer to the tire equator surface side than the first groove portion 21. As a result, it is possible to further improve the irregular wear resistance. In the same manner, the thickness in the tire width direction of the sub land portion 12 is enlarged and the rigidity of the sub land portion 12 can be enhanced by the provision of the second groove portion 22 closer to the tire equator surface side than the first groove portion 21. As a result, it is possible to enhance the effect of suppressing the irregular wear.

The connection portion 23 is connected to the end portion of the first groove portion 21 in the inner side in the tire radial direction and the end portion of the second groove port ion 22 in the tread surface side. The connect ion portion 23 is formed into a linear shape. According to this structure, since a bent shape is formed at a connection position between the first groove portion 21 and the connection portion 23 and a connection position between the second groove portion 22 and the connection portion 23, it is possible to prevent a stone from entering to the back of the narrow groove 2 at the stone biting time. A groove width of the connection portion 23 is fixed in the extending direction. The groove width of the connection portion 23 may be the same as or different from the groove width of the first groove portion 21.

The groove bottom portion 24 is provided in the end portion in the inner side of the second groove portion 22 in the tire radial direction. The groove bottom portion 24 is provided by the depression of a groove wall 22a of the second groove portion 22 in the sub land portion 12 side and the widening of the groove width. The groove bottom portion 24 is positioned closer to the ground contact end side than the groove wall of the second groove portion 22 in the main land portion 11 side. If the rigidity of the sub land portion 12 is made too high, there is fear that a crack is generated in the groove bottom of the narrow groove 2. However, since the concentration of the strain in the groove bottom can be dispersed by the provision of the groove bottom portion 24 which is depressed in the groove wall 22a of the second groove portion 22 in the sub land portion 12 side, it is possible to suppress the crack in the groove bottom of the narrow groove 2. Further, since the sub land portion 12 is provided with a flexibility by the provision of the groove bottom portion 24, it is possible to suppress the crack in the sub land portion 12.

The groove bottom portion 24 is constructed by a circular arc having a radius of curvature equal to or more than 1.5 mm, the center of which is positioned closer to the sub land portion 12 side than the center of groove width of the second groove portion 22. It is possible to disperse the concentration of the strain in the groove bottom and it is possible to further suppress the crack in the groove bottom by forming the groove bottom portion 24 into the circular arc shape.

An offset distance of the second groove portion 22 from the first groove portion 21, that is, a distance A in the tire width direction WD from a groove wall 21a of the first groove portion 21 in the sub land portion 12 side to the groove wall 22a of the second groove portion 22 in the sub land portion 12 side is preferably between 1.0 and 1.5 times of a distance B in the tire width direction WD from the groove wall 22a of the second groove portion 22 in the sub land portion 12 side to an outermost end 24a of the groove bottom portion 24 in the tire width direction. In the case that the distance A is less than 1.0 times of the distance B, the second groove portion 22 comes too close to the first groove portion 21, and the effect of reducing the ground contact pressure is weakened in the portion of the main land portion 11 near the narrow groove 2. On the other hand, in the case that the distance A is larger than 1.5 times of the distance B, the second groove portion 22 comes too away from the first groove portion 21, and the effect of reducing the ground contact pressure is weakened in the portion of the main land portion 11 near the narrow groove 2. The distance A is, for example, between 1 and 4.5 mm, and the distance B is, for example, between 1 and 3 mm.

A distance C in the tire width direction WD from the outermost end 24a of the groove bottom portion 24 in the tire width direction to the outer wall 12a of the sub land portion 12 in the tire width direction is preferably equal to or more than 3.5 times of the distance B in the tire width direction WD from the groove wall 22a of the second groove portion 22 in the sub land portion 12 side to the outermost end 24a of the groove bottom portion 24 in the tire width direction. In the case that the distance C is smaller than 3.5 times of the distance the thickness of the sub land portion 12 in the tire width direction becomes smaller and the crack tends to be generated in the sub land portion itself. The distance C is, for example, between 7 and 14 mm, and is preferably set to be equal to or more than 7 mm.

An angle θ formed between the first groove portion 21 and the connection portion 23 and an angle θ formed between the second groove portion 22 and the connection portion 23 are preferably between 80 and 170 degrees, more preferably obtuse angles and particularly preferably between 130 and 160 degrees. In the case that the angle θ is less than 80 degrees, a releasing resistance of a rib part for forming the narrow groove 2 is enlarged at the mold releasing time in the vulcanizing step, and a crack tends to be generated beginning at a connection position between the first groove portion 21 and the connection portion 23 and a connection position between the second groove portion 22 and the connection portion 23. On the other hand, in the case that the angle θ is larger than 170 degree, the effect of reducing the ground contact pressure is weakened in the portion of the main land portion 11 near the narrow groove 2, and the stone tends to enter into the back of the narrow groove 2 at the stone biting time.

The pneumatic tire according to the present invention is the same as the normal pneumatic tire except the formation of the narrow groove 2 into the cross sectional shape as mentioned above, and the conventionally known materials, shapes, structures and manufacturing methods can be employed in the present invention.

Other Embodiment

In the embodiment mentioned above, the connection portion 23 is formed into the straight shape but may be formed into a curved shape.

EXAMPLES

A description will be given below of examples which specifically show the structure and the effect of the present invention. Items of evaluation in the examples were measured as follows.

Irregular Wear Resistance

A test tire (295/75R22.5) was assembled in a wheel having a rim size 22.5×8.25 under a pneumatic pressure 760 kPa (internal pressure defined by TRA), and a traveling test was executed under a condition of a speed 80 km/h and a load 27.5 kN (TRA 100% load). An inverse number of a ratio of an amount of wear in the shoulder land portion in relation to an amount of wear in the center land portion was indicated by an index number obtained by setting comparative example 1 to 100. The greater the value is, the more excellent the irregular wear resistance is.

Groove Bottom Crack Resistance

A test tire (295/75R22.5) was assembled in a wheel having a rim size 22.5×8.25 under a pneumatic pressure 760 kPa (internal pressure defined by TRA), a traveling test was executed under a condition of a speed 60 km/h and a load 21.8 kN, and a groove bottom crack width after traveling for 15 thousands km was measured. The groove bottom crack width of each of the examples was shown by the index number obtained by setting the groove bottom crack width of comparative example 1 to 100. The greater the value is, the more excellent the groove bottom crack resistance is.

Sub Land Portion Crack Resistance

The traveling test was executed under the same condition as that of the groove bottom crack resistance, and it was searched whether or not any crack is generated in the sub land portion after traveling for 15 thousands km.

Example 1

The pneumatic tire having the shoulder land portion 1 provided with the narrow groove 2 shown in FIG. 1 was manufactured. Results obtained by carrying out the evaluations mentioned above by using the pneumatic tire will be shown in Table 1.

Examples 2 to 6

The pneumatic tire having the same structure as example 1 except that the distance A and the distance C are differentiated from example 1 was manufactured. Results obtained by carrying out the evaluations mentioned above by using the pneumatic tires will be shown in Table 1.

Comparative Example 1

Figure 2:
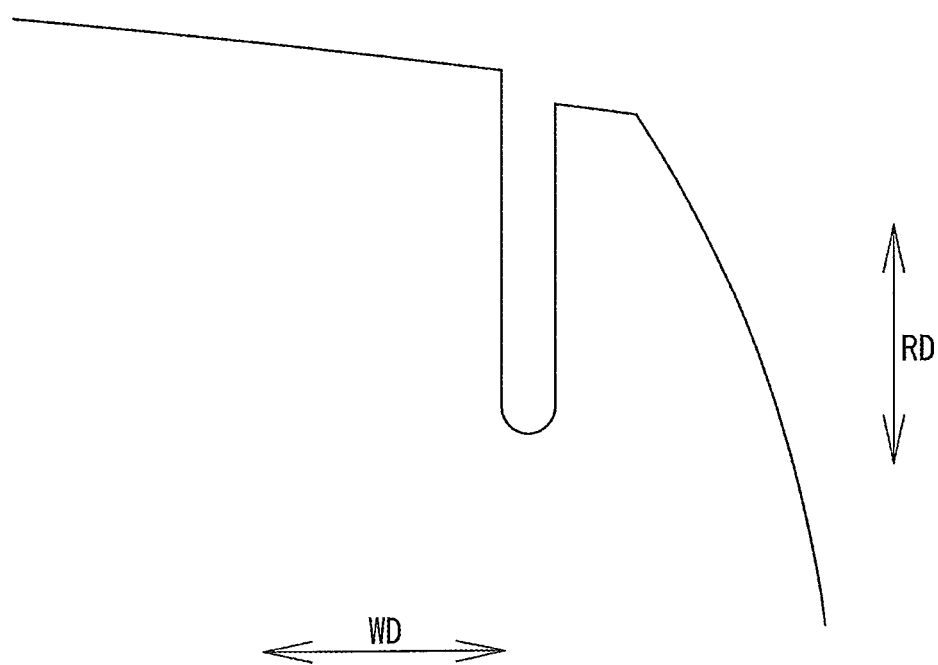
FIG. 2 is a cross sectional view in a tire meridian direction in a shoulder land portion according to comparative example 1.

The pneumatic tire having the shoulder land portion provided with the narrow groove shown in FIG. 2 was manufactured. Results obtained by carrying out the evaluations mentioned above by using the pneumatic tire will be shown in Table 1.

TABLE 1

|  | Example 1 | Example 2 | Example 3 | Example 4 | Example 5 | Example 6 | Comparative Example 1 |
|---|---|---|---|---|---|---|---|
| A | 2.6 | 2 | 3 | 1.6 | 3.2 | 2.4 | — |
| B | 2 | 2 | 2 | 2 | 2 | 2 | — |
| A/B | 1.3 | 1 | 1.5 | 0.8 | 1.6 | 1.2 | — |
| C | 10 | 7 | 12 | 7 | 13 | 6 | — |
| C/B | 5.0 | 3.5 | 6.0 | 3.5 | 3.5 | 3.0 | — |
| Irregular wear resistance | 120 | 115 | 115 | 112 | 112 | 114 | 100 |
| Groove bottom crack resistance | 115 | 115 | 115 | 112 | 115 | 112 | 100 |
| Sub land portion crack resistance | No | No | No | No | No | Yes | Yes |

As shown in Table 1, it can be known that the irregular wear resistance and the groove bottom crack resistance are improved in the pneumatic tires according to examples 1 to 6 in comparison with the pneumatic tire according to comparative example 1. Further, in the pneumatic tires according to examples 1 to 5, the crack in the sub land portion could be suppressed. However, in the pneumatic tire according to example 6, the crack was generated in the sub land portion since the distance C is small.

What is claimed is:

1. A pneumatic tire comprising:
   a shoulder land portion which extends in a tire circumferential direction; and
   a narrow groove which extends in the tire circumferential direction closer to a tire equator surface side than a ground contact end of the shoulder land portion and sections the shoulder land portion into a main land portion in the tire equator surface side and a sub land portion in the ground contact end side,
   the shoulder land portion and the narrow groove being provided in a tread surface,
   wherein, in a cross-sectional view, a cross-sectional shape of the narrow groove in a tire width direction comprises:
   a first groove portion which extends in parallel to the tire equator surface from the tread surface toward an inner side in a tire radial direction, the first groove portion having a first side wall and a second side wall which opposes the first side wall and is provided closer to the tire equator surface side than the first side wall, the first side wall and the second side wall being linear in the cross-sectional view;
   a second groove portion which is provided closer to the inner side in the tire radial direction and the tire equator surface side than the first groove portion such that a width of the first groove portion does not overlap a width of the second groove portion in the tire width direction, and extends in parallel to the tire equator surface, the second groove portion having a third side wall and a fourth side wall which opposes the third side wall and is provided closer to the tire equator surface side than the third side wall, the third side wall and the fourth side wall being linear in the cross-sectional view;
   a connection portion which is connected to an end portion of the first groove portion in the inner side in the tire radial direction and an end portion of the second groove portion in the tread surface side; and
   a groove bottom portion which is provided in an end portion of the second groove portion in the inner side in the tire radial direction and has a widened groove width by depressing a groove wall of the second groove portion in the sub land portion side, and
   wherein the cross-sectional shape of the narrow groove is configured such that the third side wall is located closer to the tire equator surface side than the second side wall in the cross-sectional view.

2. The pneumatic tire according to claim 1, wherein a distance A in the tire width direction from a groove wall of the first groove portion in the sub land portion side to the groove wall of the second groove portion in the sub land portion side is between 1.0 and 1.5 times of a distance B in the tire width direction from the groove wall of the second groove portion in the sub land portion side to an outermost end of the groove bottom portion in the tire width direction.

3. The pneumatic tire according to claim 1, wherein a distance C in the tire width direction from the outermost end of the groove bottom portion in the tire width direction to an outer wall of the sub land portion in the tire width direction is equal to or more than 3.5 times of a distance B in the tire width direction from the groove wall of the second groove portion in the sub land portion side to the outermost end of the groove bottom portion in the tire width direction.

4. The pneumatic tire according to claim 1, wherein a groove width of the first groove portion is constant in an extending direction, and both groove walls of the first groove portion are parallel to the tire equator surface.

5. The pneumatic tire according to claim 1, wherein a groove width of the second groove portion is constant in an extending direction, and both groove walls of the second groove portion are parallel to the tire equator surface.

6. The pneumatic tire according to claim 1, wherein the connection portion is formed into a linear shape.

7. The pneumatic tire according to claim 1, wherein the groove bottom portion is constructed by a circular arc, the center of which is positioned closer to the sub land portion side than the center of groove width of the second groove portion.

8. The pneumatic tire according to claim 1, wherein the groove bottom portion is constructed by a circular arc having a radius of curvature equal to or more than 1.5 mm.

9. The pneumatic tire according to claim 1, wherein an angle formed between the first groove portion and the connection portion and an angle formed between the second groove portion and the connection portion are between 80 and 170 degrees.

10. The pneumatic tire according to claim 1, wherein the narrow groove is provided in an area which is within 5% of the tread ground contact width on the basis of the ground contact end.

* * * * *